United States Patent
Hsu

(10) Patent No.: US 7,526,014 B2
(45) Date of Patent: Apr. 28, 2009

(54) CORRELATOR FOR SPREAD SPECTRUM RECEIVER

(75) Inventor: Chia-Chang Hsu, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 554 days.

(21) Appl. No.: 11/007,163

(22) Filed: Dec. 9, 2004

(65) Prior Publication Data

US 2006/0023776 A1 Feb. 2, 2006

Related U.S. Application Data

(60) Provisional application No. 60/528,489, filed on Dec. 11, 2003.

(51) Int. Cl.
*H04B 1/69* (2006.01)
*H04B 1/707* (2006.01)
*H04B 1/713* (2006.01)

(52) U.S. Cl. .............. 375/150; 375/147; 375/148; 375/149; 375/142; 375/144; 455/12.1

(58) Field of Classification Search ................ 375/150, 375/147, 148, 149, 141, 142, 144, 145; 455/12.1
See application file for complete search history.

(56) References Cited

U.S. PATENT DOCUMENTS 5,896,304 A   4/1999   Tiemann et al. ............ 364/604
6,009,118 A   12/1999  Tiemann et al. ............ 375/208
6,393,046 B1  5/2002   Kohli et al. ................. 375/134
6,532,251 B1* 3/2003   King et al. .................. 375/142
7,068,708 B2* 6/2006   LaRosa et al. .............. 375/148
7,099,623 B2* 8/2006   Gibson et al. .............. 455/12.1
2003/0174681 A1* 9/2003  Gilberton et al. ........... 370/338

* cited by examiner

*Primary Examiner*—Phuong Phu
(74) *Attorney, Agent, or Firm*—WPAT., P.C.; Justin King

(57) ABSTRACT

The present invention discloses correlation architecture in the application of full-digital GPS (Global Positioning System) receivers. According to the present invention, a satellite C/A code generator is employed to generate N-bit parallel code data at a time, and a Doppler frequency generator is used to generate N-bit parallel Doppler frequency data at a time. Signals received by the receiver can be temporarily stored in a buffer that provides N-bit parallel reception data to a correlation circuit. In the correlation circuit, a N-bit multiplier is used to multiply the N-bit reception data by the N-bit C/A code data and the N-bit Doppler frequency data to generate multiplication results. The N-bit multiplication results are thereafter summed up in parallel by a digital summator. Accordingly, the correlator of the present invention can improve circuit performance and save the required cost.

12 Claims, 9 Drawing Sheets

CORRELATOR FOR SPREAD SPECTRUM RECEIVER

CROSS-REFERENCE TO RELATED APPLICATION

The present application claims the priority benefits of U.S. provisional application entitled "HIGH EFFICIENT, LOW POWER, LOW COST GPS CORRELATION ARCHITECTURE" filed on Dec. 11, 2003 Ser. No. 60/528,489. All disclosures of this application are incorporated herein by reference.

BACKGROUND OF THE INVENTION

1. Field of the Invention

The present invention generally relates to spread spectrum communications systems. More particularly, the present invention relates to correlation architecture in the application of GPS (Global Positioning System) receivers.

2. Description of Related Art

Spread spectrum communication is advantageous in communication applications requiring low-power and high reliability in a noisy environment. GPS is one of ubiquitous applications of the spread spectrum communication. Though being originally developed for positioning and navigation in military systems, GPS has been widely applied to car navigation systems and may be probably applied to mobile phone navigation systems in the future.

The GPS system comprises twenty-four satellites, each of which is provided with position and time message data. The message data sequence with a rate of 50 bits per second are mixed with a satellite C/A (course/acquisition) code and then sent on a radiofrequency channel by having the mixed sequence modulated by a carrier frequency of 1575.42 MHz. Each satellite is provided with a unique C/A code that a 1023-bit pseudo-random code with a 1.023 MHz chipping rate and a 1 ms repetition period. A GPS receiver at user's end can replicate every satellite C/A code so as to search and track satellite data streams efficiently.

Referring to FIG. 1, a diagram of a conventional GPS receiver is illustrated schematically. As shown in FIG. 1, a RF front-end circuit 10 receives the data stream and removes the 1575.42 MHz carrier from the received data stream such that a signal is produced at a lower frequency in the range around 1 MHz or 4 MHz and thereafter provided to be processed by a GPS base-band circuit 12. The GPS base-band circuit 12 comprises a correlator 14 and a data extractor 16. The correlator 14 is used to search C/A codes as well as Doppler frequencies and track the satellites that have been found. The data extractor 16 is employed to acquire the message data with the rate of 50 bits/sec contained in the received message data sequence and then transmit the acquired message data to a GPS navigator 18. The GPS navigator 18 is used to compute the associated navigation data, such as speed, position and coordinates transformation, accordingly. The navigation data are thereafter sent to a computer system for further processing.

Usually, the conventional GPS receiver is designed to search and track twelve satellites in twelve different channels and thus provided with twelve correlators corresponding to the twelve channels respectively. In other words, each correlator is used to process the message data transmitted from the corresponding satellite.

Referring to FIG. 2, a schematic diagram of a correlator for the conventional GPS receiver is illustrated. As shown in FIG. 2, the data sequence received from the RF front-end circuit 10 is divided into I (in-phase) data and Q (quadrature-phase) data by an I/Q separator 20. The I and Q data are received by respective Doppler multipliers 26a and 26b in which serial frequency data generated by a Doppler frequency generator 22 multiply by the I and Q data respectively. The outputs of the Doppler multipliers 26a and 26b are received by respective C/A code multipliers 28a and 28b in which serial C/A code data generated by a C/A code generator 24 multiplies by the outputs of the Doppler multipliers 26a and 26b in order to obtain inner products, respectively.

The inner products generated by the C/A code multipliers 28a and 28b are received by respective coherence integrators 30a and 30b in which the inner products are accumulated 1023 times for a repetition period. The outputs of the coherence integrators 30a and 30b are sequentially applied to a squarer 32 for square operation and a non-coherence integrator 34 for accumulating the data for 20 ms. The output of the non-coherence integrator 34 is sent to a peak detector 36 for peak detection. Occurrence of peak maximum means that the current C/A code and the Doppler frequency are matched with those provided by the satellite being received.

Though the conventional correlator of FIG. 2 is advantageous in simple architecture and low cost, the performance is constrained by data rate, that is, 1023 operations of accumulation for one C/A code is required, and therefore suffers from the problem of low speed. In addition, the whole circuit of the conventional correlator must be continually powered during the period of circuit operation that is not suitable for low-power applications.

One approach to speed up performance is disclosed in U.S. Pat. No. 6,393,046 pertaining to an improved correlator as shown in FIG. 3. According to the improved correlator disclosed in U.S. Pat. No. 6,393,046, the input data sequence received for one repetition period is divided into tens of 11-bit data segment which are processed in parallel so as to speed up the performance.

As shown in FIG. 3, the data sequence sent from the RF front-end circuit is separated by an I/Q separator 106 to generate in-phase I data and quadrature-phase Q data that are thereafter processed by a shift register 120 to become 11-bit parallel data 122 to be sent to Doppler 108 for multiplication operations. The data sequence generated by the Doppler 108 is processed by a shifter register 166 to become 11-bit parallel data 140. Moreover, the C/A code generated by a C/A code generator 112 is processed by a shift register 170 to become 11-bit parallel code data that multiply by the 11-bit parallel data 140 to generate an 11-bit inner product. The parallel inner product is accumulated by a partial accumulator 175 and then accumulated 93 times for 1 ms repetition period by a coherence integrator 114. The output of the coherence integrator 114 is provided to a circuit 116 for non-coherence integration and peak detection.

Though the correlator as depicted in FIG. 3 can improve the performance 11 times that of the conventional correlator of FIG. 2, the step for converting data sequence into parallel data operates at a higher frequency and thus consumes more power. Moreover, the Doppler frequency generated by the Doppler frequency generator and the C/A code generated by the C/A code generator are both in form of serial data, several shift registers are required to convert the data sequence into parallel data such that the cost is increased and the speed switching among different channels is decreased. Furthermore, similar to the conventional correlator of FIG. 2, the whole circuit of the conventional correlator must be continually powered during the period of circuit operation that is not suitable for low-power applications.

SUMMARY OF THE INVENTION

Therefore, it is an object of the present invention to provide a correlator for GPS receivers, which is provided with a Doppler frequency generator and a C/A code generator in parallel architecture such that the correlator in accordance with the present invention is advantageous in high speed and better design flexibility without using high frequency.

It is another object of the present invention to provide a correlator for GPS receivers with shared hardware architecture such that the correlator in accordance with the present invention is advantageous in smaller chip area, lower manufacturing cost and low power.

For achieving the aforementioned objects, the present invention provides a correlator for a spread spectrum receiver capable of receiving a signal from a transmitter, which comprises a code generator, a buffer, a correlation circuit and a detector. The code generator is used for generating a set of identification codes associated with the transmitter and providing an N-bit parallel code data. The buffer is employed for storing the received signal and generating an N-bit parallel reception data associated with the received signal. The correlation circuit is coupled to the code generator and the buffer so as to generate a correlation result in response to the code data and the reception data. The detector is used for determining whether the set of identification codes is correspondent with the received signal in response to the correlation result.

Moreover, the present invention provides a correlator for a spread spectrum receiver capable of receiving signals from a plurality of transmitters, which comprises a control circuit, a code generator a buffer, a correlation circuit and a detector. The control circuit is used for controlling the correlator to process the signals associated with one of the plurality of transmitters during a period of time. The code generator is controlled by the control circuit and used to generate a set of identification codes associated with the one of the plurality of transmitters and providing an N-bit parallel code data. The buffer is employed for storing the processed signals and generating an N-bit parallel reception data associated with the processed signals. The correlation circuit is coupled to the code generator and the buffer, each of which is used to generate a correlation result in response to the code data and the reception data. The detector is employed to determine whether the set of identification codes is correspondent with the processed signals in response to the correlation result.

DETAILED DESCRIPTION OF THE PREFERRED EMBODIMENTS

In the following description of the preferred embodiments, half-chip width bits are taken as an example and therefore a correlator will search 2046 different kinds of C/A code within 1 ms period.

Figure 4:
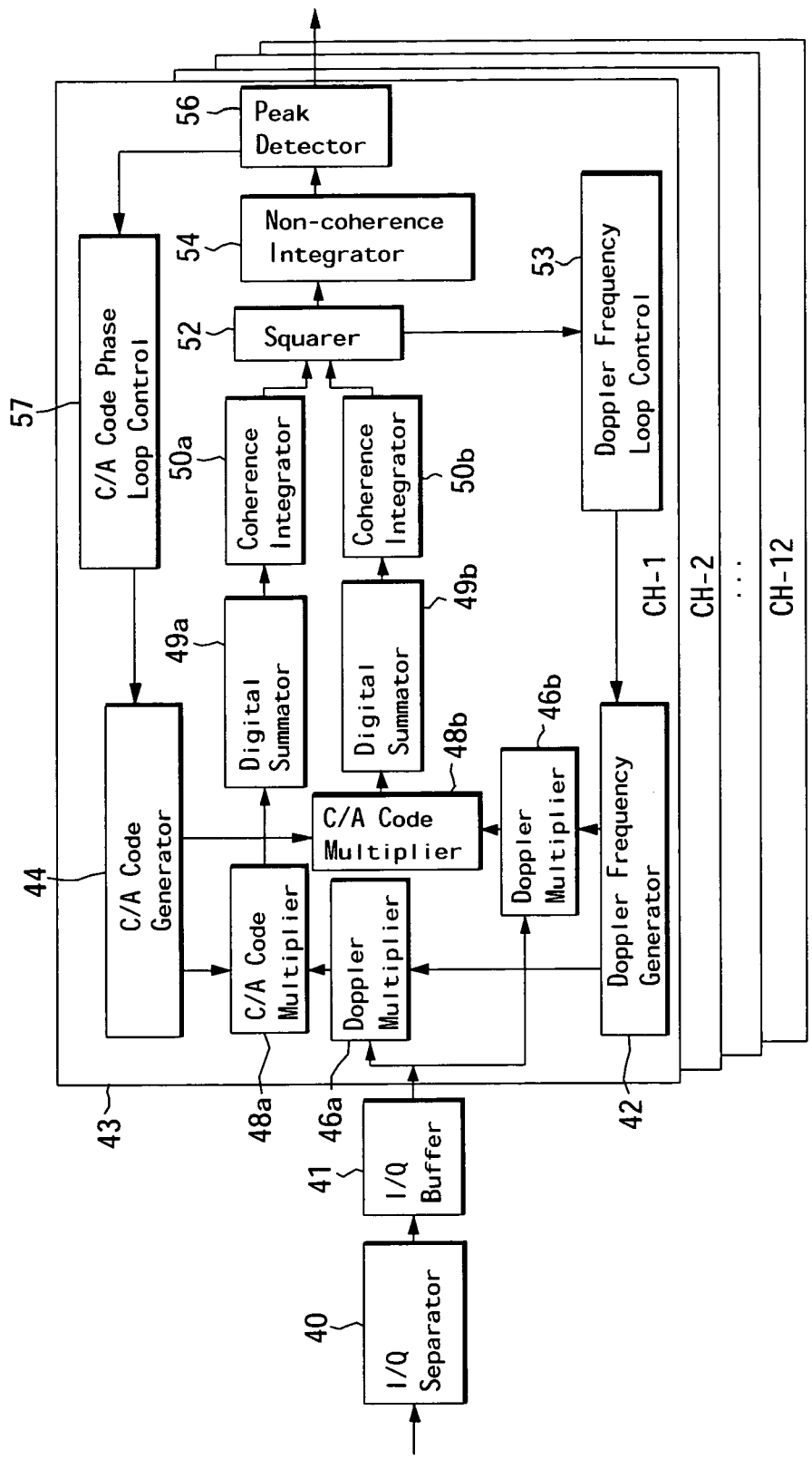
FIG. 4 schematically depicts a block diagram of a correlator in accordance with the first preferred embodiment of the present invention.

Referring to FIG. 4, a diagram of a correlator in accordance with the first preferred embodiment of the present invention is depicted schematically. As shown in FIG. 4, message data sequence sent from a RF front-end circuit is separated by an I/Q separator 40 into in-phase I data and quadrature-phase Q data. A shift register (not shown in the drawing) is employed to store the I and Q data into an I/Q buffer 41. The I/Q buffer 41 generates the output data in form of 64-bit in parallel, which are provided to a correlator 43 for processing. In this embodiment, the I/Q buffer 41 can store data sequence for two C/A code repetition periods, that is, 2 ms, and function like a ping-pong buffer. Therefore, the data sequence of one repetition period can be sent to the correlator 43 while the data sequence of another repetition period starts to store into the I/Q buffer 41.

Figure 1:
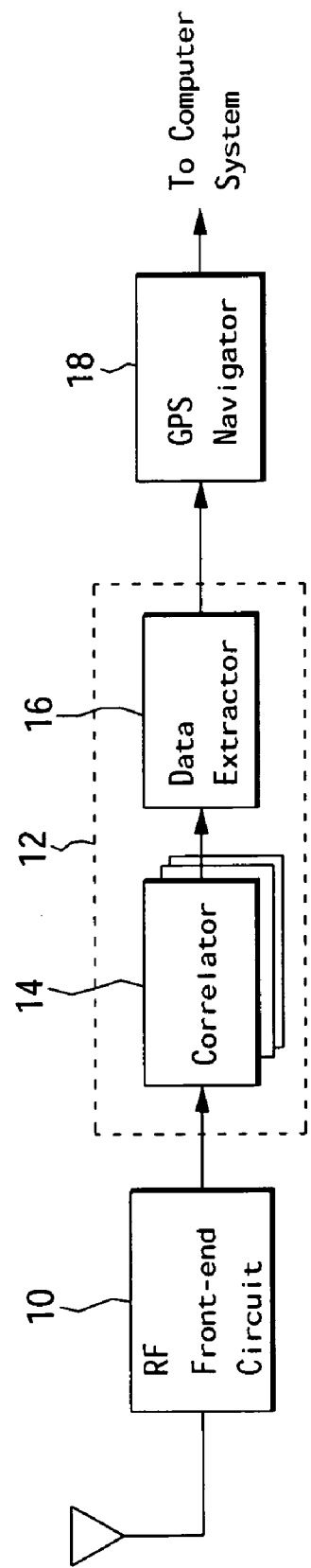
FIG. 1 schematically depicts a block diagram of a conventional GPS receiver.
Figure 2:
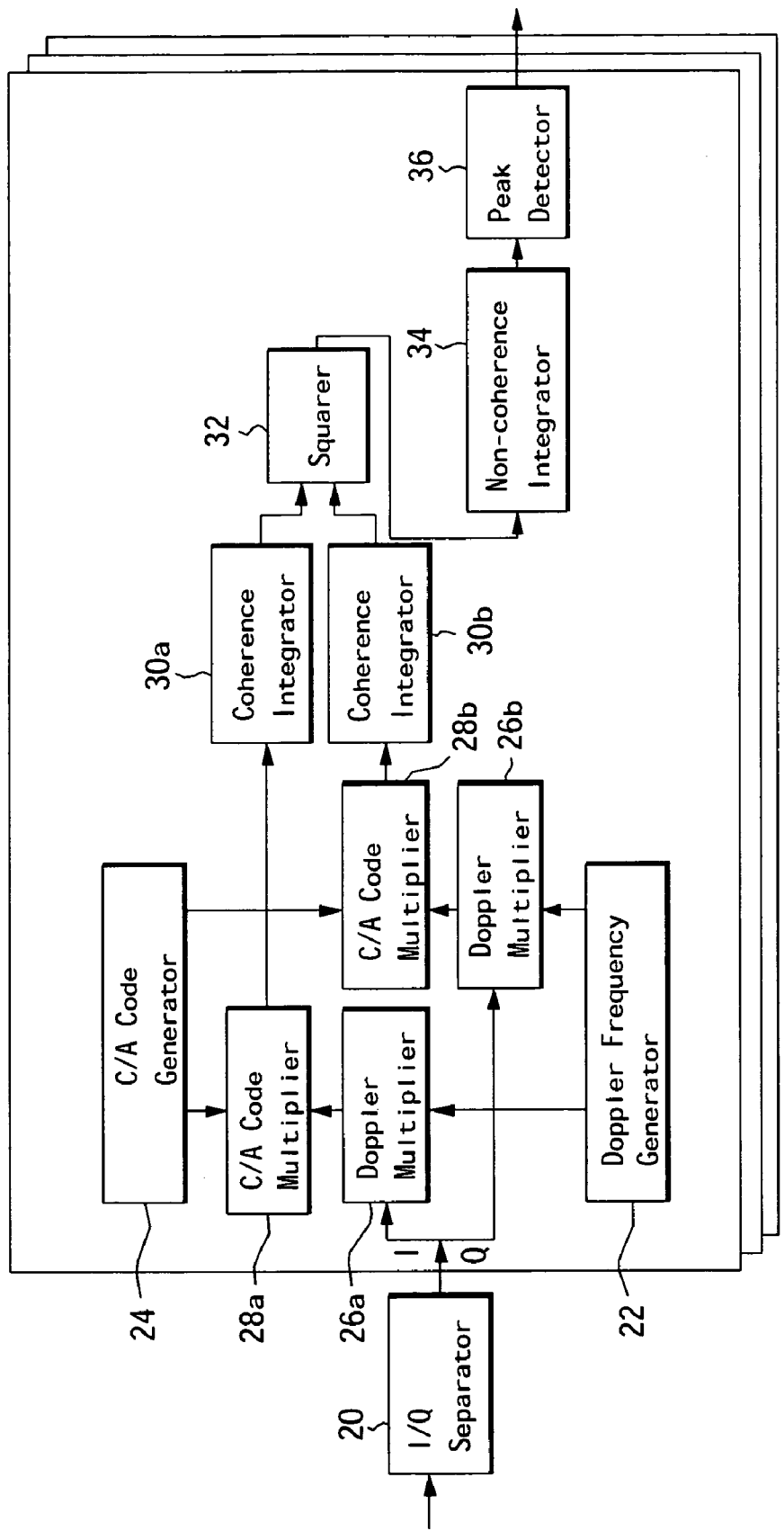
FIG. 2 schematically depicts a block diagram of a correlator of the conventional GPS receiver.
Figure 3:
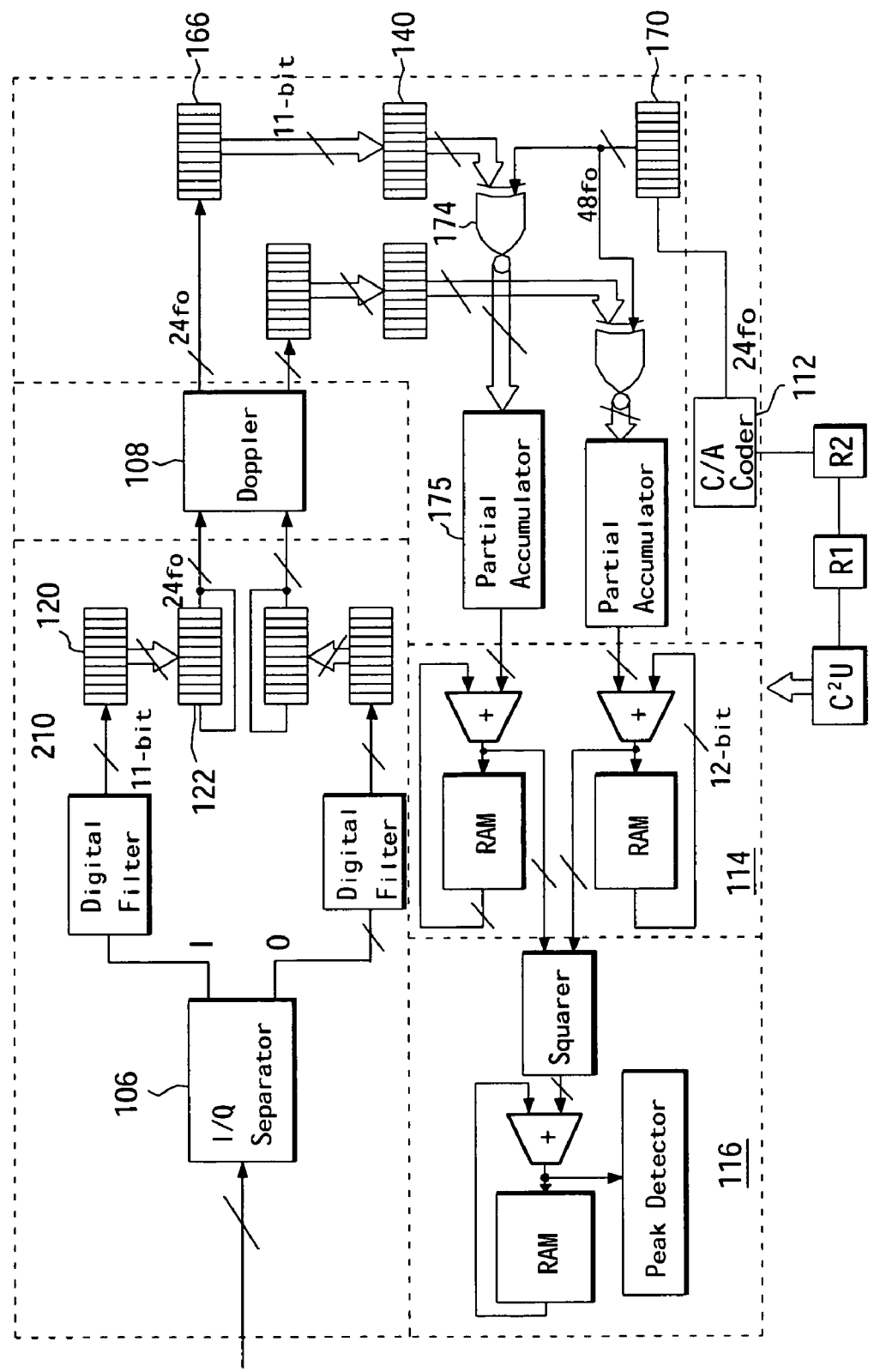
FIG. 3 illustrates a circuit diagram of a conventional correlator disclosed in U.S. Pat. No. 6,393,046.

As compared with the conventional correlators of FIGS. 2 and 3, a 64-bit Doppler frequency generator 42 is employed to generate 64-bit parallel Doppler frequency data, and a 64-bit C/A code generator 44 is employed to generate 64-bit parallel code data. Thus, the 64-bit parallel data provided from the I/Q buffer 41 to the correlator 43 can multiply by the 64-bit parallel Doppler frequency data generated by the Doppler frequency generator 42 in Doppler multiplier 46a and 46b, and also multiply by the 64-bit parallel code data generated by the C/A code generator 44 in C/A code multipliers 48a and 48b. Accordingly, a 64-bit inner product can be generated at a time.

The 64-bit inner products are summed up in parallel by means of digital summator 49a and 49b and then accumulated 32 times for one repetition period of 1 ms by coherence integrators 50a and 50b. The outputs of the coherence integrators 50a and 50b are sequentially subject to a squarer 52 for square operations and a non-coherence integrator 54 for accumulating the data for 20 ms. The output of the non-coherence integrator 54 is sent to a peak detector 56 for peak detection. Occurrence of peak maximum means that the current C/A code and the Doppler frequency are matched with those provided by the satellite being received. In practice, the peak detector 56 can be implemented by hardware or software.

The correlator 43 of FIG. 4 can be used to search satellites and track the same as well. When being employed to track a satellite, the correlator 43 further comprises a C/A code phase loop control 57 connected between the peak detector 56 and the C/A code generator 44, and a Doppler frequency loop control 53 connected between the squarer 52 and the Doppler frequency generator 42. In response to a detection result generated by the peak detector 56, the C/A code phase loop control 57 is used to control the correct position of the C/A code and thus maintain at a re-lock status. In response to frequency difference associated with phase difference upon the outputs of the coherence integrators 50a and 50b, the Doppler frequency loop control 53 is used to adjust the Doppler frequency to ensure the operations of tracking and locking correctly.

In the first embodiment, twelve correlators 43 should be provided in view of twelve channels; each correlator 43 is employed to process the data of the associated satellite. Because the same correlation architecture can be used to search and track satellites as well, the correlator 43 can be well controlled to switch between a search mode and a track mode. The first preferred embodiment of the present invention makes use of 64-bits parallel processing and thus improved the performance 64 times that of the conventional correlator of FIG. 2. It is noted that the parallel processing in form of 64-bit is exemplified but not used to limit the scope of the present invention to the embodiment. In practice, parallel processing using a bit number less or greater than 64 is feasible once the designer can balance chip cost and circuit performance.

In addition, because the Doppler frequency generator 42 can generate 64-bit parallel Doppler frequency data at a time and the C/A code generator 44 can generate 64-bit parallel C/A code data at a time, which are different from the Doppler frequency data and the C/A code data generated in series by the conventional circuit of FIG. 3. Therefore, there is no need to provide shift registers in connection with the Doppler frequency generator and the C/A code generator whereby chip area and cost can be decreased without operating at higher frequency.

Figure 5:
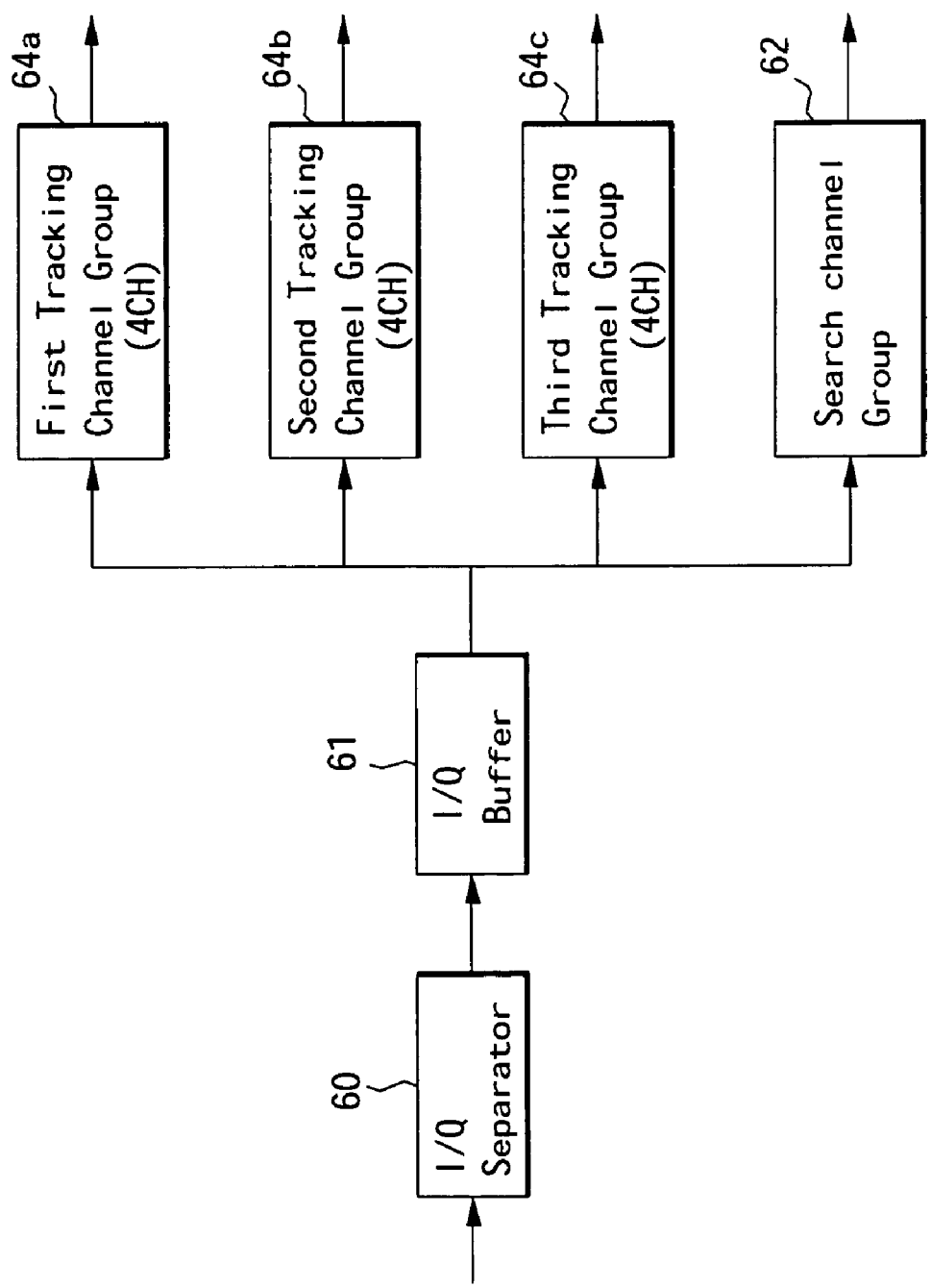
FIG. 5 schematically depicts a block diagram of a correlator in accordance with the second preferred embodiment of the present invention.

Referring to FIG. 5, a diagram of a correlator in accordance with the second preferred embodiment is illustrated schematically. Unlike the correlator of FIG. 4, this embodiment does not provide one correlator corresponding to each channel, but adopt the design of shared hardware architecture. Moreover, the correlator of FIG. 5 cannot be used to switch between the satellite search mode and the satellite track mode, but separate circuits are provided to deal with satellite searching and satellite tracking.

As shown in FIG. 5, the message data sequence sent from the RF front-end circuit is separated by an I/Q separator 60 into in-phase I data and quadrature-phase Q data. A shift register (not shown in the drawing) is employed to store the I and Q data into an I/Q buffer 61. The I/Q buffer 61 generates the output data in parallel to be provided to a first tracking channel group 64a, a second tracking channel group 64b, a third tracking channel group 64c and a search channel group 62 for processing. The first tracking channel group 64a, the second tracking channel group 64b and the third tracking channel group 64c are used for satellite tracking, each of which tracks four satellite channels. The search channel group 62 is used for satellite searching, the details of which will be described in the following.

Figure 6:
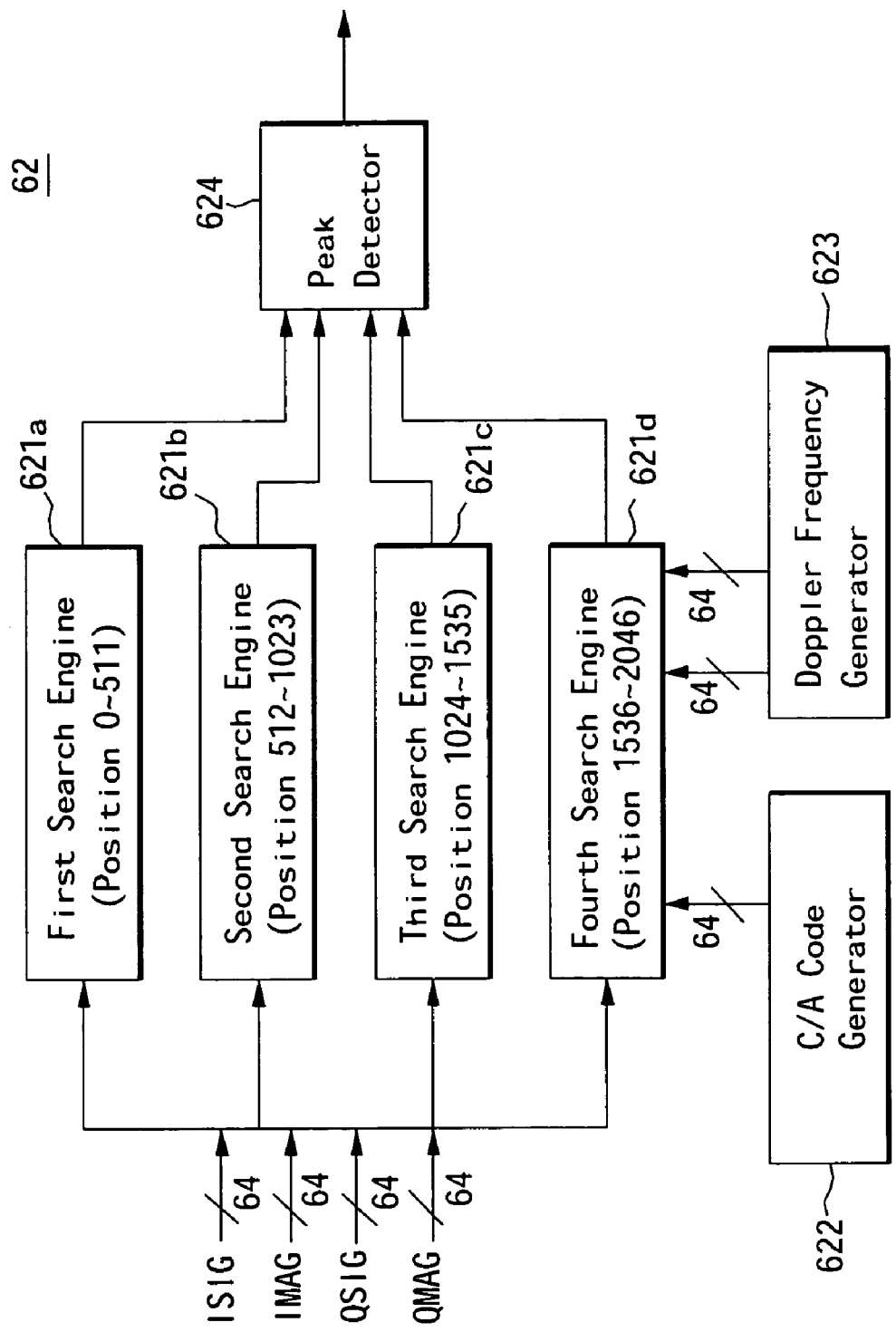
FIG. 6 schematically illustrates a detailed diagram of a search channel group of FIG. 5.

Referring to FIG. 6, a detailed diagram of the search channel group 62 of FIG. 5 is schematically illustrated. In FIG. 6, the search channel 62 comprises first through fourth search engines 621a~621d for receiving 64-bit parallel data ISIG, IMAG, QSIG and QMAG while the first through fourth search engines 621a~621d are used to process 0~511 position combinations, 512~1023 position combinations, 1024~1535 position combinations and 1536~2046 position combinations, respectively. As such, all 2046 position combinations can be computed thoroughly in the period of 1 ms.

Figure 7:
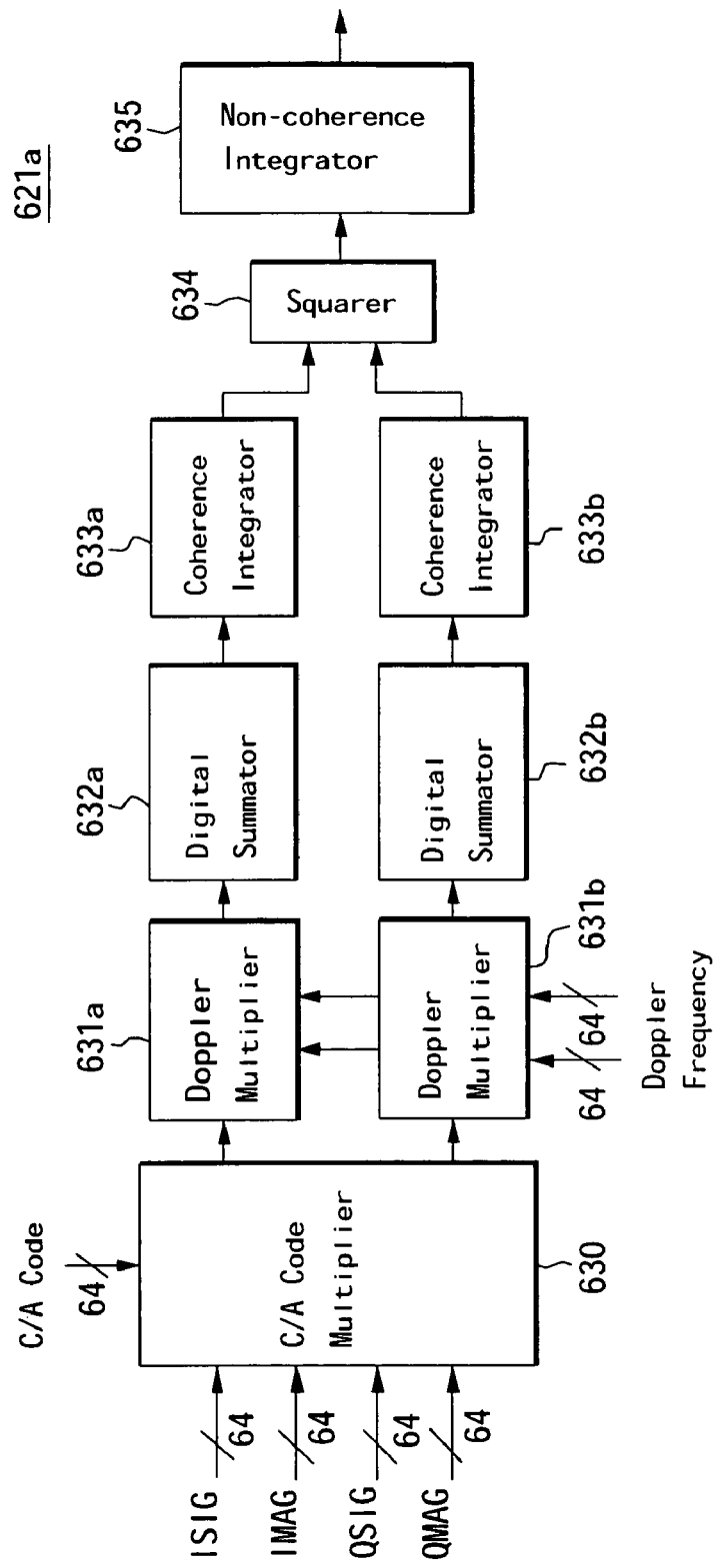
FIG. 7 schematically illustrates a diagram of a search engine of FIG. 6.

The first through fourth search engines 621a~621d have the same structure as shown in FIG. 7. Referring to FIG. 7, the I/Q buffer 61 provides the 64-bit parallel data ISIG, IMAG, QSIG and QMAG to the search engines 621a~621d, each of which comprises a C/A code multiplier 630 and two Doppler multipliers 631a and 631b. The 64-bit parallel data ISIG, IMAG, QSIG and QMAG can multiply by the 64-bit parallel C/A code data generated by a C/A code generator 622 of FIG. 6 in the C/A code multiplier 630. In addition, the 64-bit parallel data ISIG, IMAG, QSIG and QMAG can multiply by the 64-bit parallel Doppler frequency data generated by a Doppler frequency generator 623 in the Doppler multiplier 631 and 631b so as to generate inner products. The inner products are summed up in parallel by means of digital summators 632a and 632b and then accumulated for a period of 1 ms to obtain operation results by coherence integrators 633a and 633b. The outputs of the coherence integrators 633a and 633b are sequentially subject to a squarer 634 for square operations and a non-coherence integrator 635 for accumulating the data for 20 ms.

The outputs of the first through fourth search engines 621a~621d are applied to a peak detector 624 of FIG. 6 for peak detection. The search mechanism can be implemented by software to search each channel and thus find the maximum value. Once the satellite has been found after search, the tracking channel groups will take over to track the satellite.

In the second embodiment, four 64-bit search engines are employed to attain the performance 256 times that of the correlator of FIG. 2. However, the number of the search engine and the bit number of the date processed in parallel are merely exemplified for reference and cannot be used to limit the scope of the present invention.

Usually, four satellites found after search are sufficient to determine the position accurately. Once sufficient satellites have been found, the power of the search engines can be turned off temporarily until satellite search is necessary again for the purpose of power conservation.

The GPS receiver is usually designed to track twelve satellites. Referring to FIG. 5, the GPS receiver has first through third tracking channel groups 64a~64c, each of which is charge of tracking four satellites. During tracking satellites, the embodiment takes advantage of parallel processing to shorten calculation time. Moreover, there are minor variations in the C/A code and Doppler frequency during the period of 1 ms such that the range in proximity to the peak maximum found previously should be tracked. Accordingly, tracking channel can be finished at a short period of time so that plural satellites in the same tacking channel group can be tracked during the period of 1 ms.

The first through third tracking channel group 64a~64c have the same structure. In simple and concise, the first tracking channel group 64 is exemplified and shown in FIG. 8.

Figure 8:
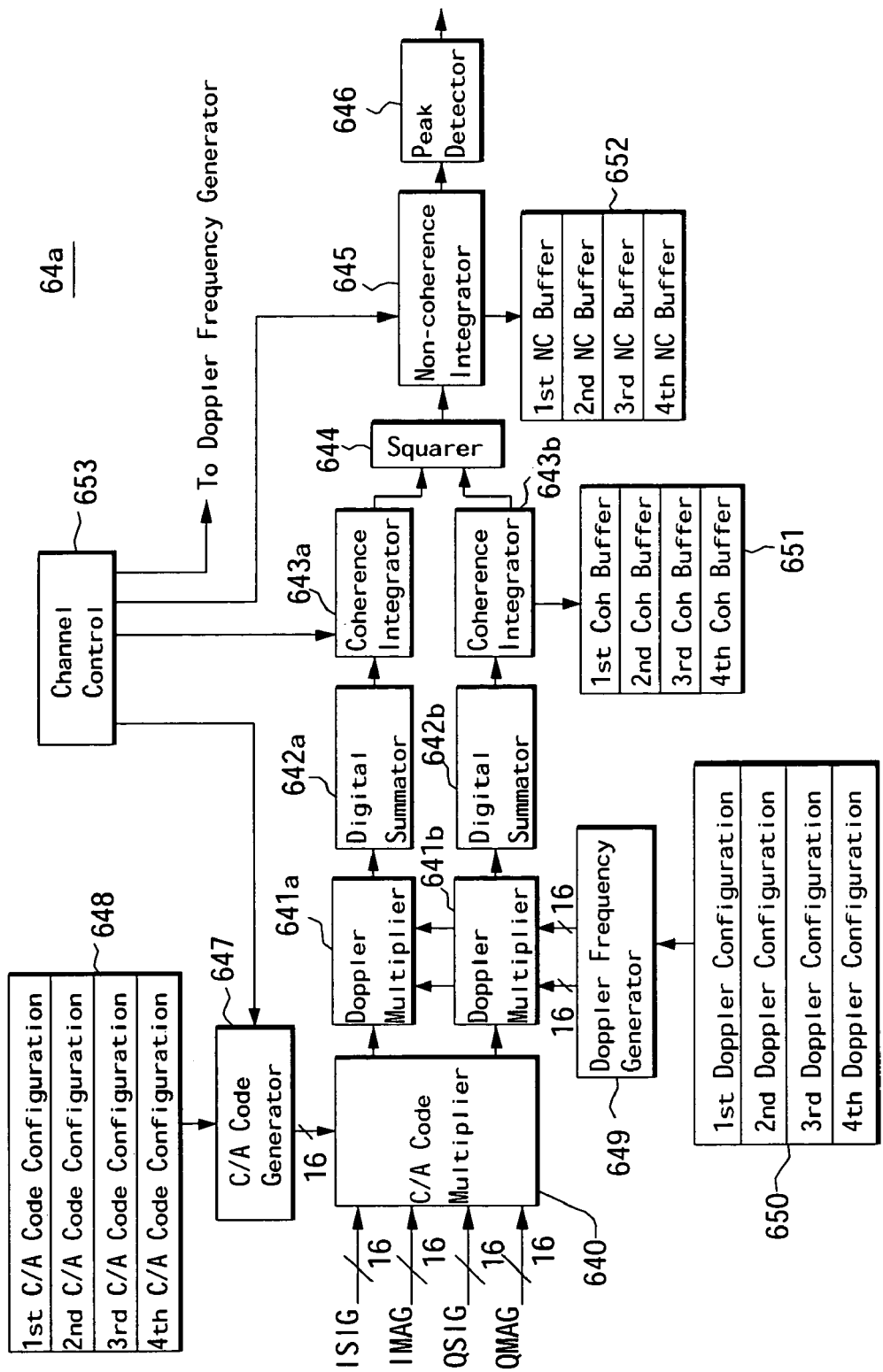
FIG. 8 schematically illustrates a detailed diagram of a tracking channel group of FIG. 5.

Referring to FIG. 8, a diagram of the first tracking channel group 64a for the correlator of FIG. 5 is schematically depicted. Because the first tracking channel group 64a is in charge of tracking first through four channels, a C/A code configuration storage area 648 stores the C/A code configurations (S1 ,S2) of four different satellites. Similarly, a Doppler frequency configuration storage area 650 is used to store the Doppler frequency configurations of the four different satellites. When tracking a satellite, a channel control 653 is used to control a C/A code generator 647 and a Doppler frequency generator 649 to read the associated C/A code configuration and the associated Doppler frequency configuration of the tracked satellite.

Figure 9:
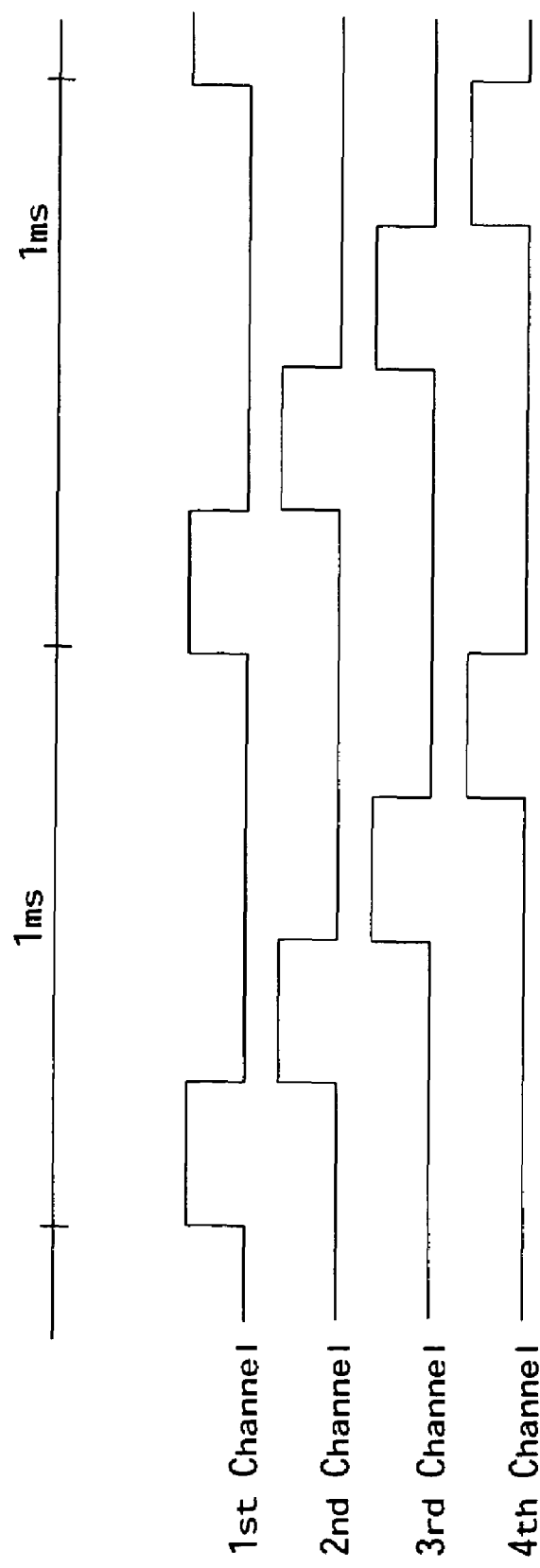
FIG. 9 is a timing diagram for explaining the control method used by the channel control of FIG. 8.

The operation of the channel control 653 can be referred to the control method as depicted in FIG. 9. In FIG. 9, the 1 ms period is divided into four sub-periods assigned for four different channels to be tracked. In this embodiment, the C/A code generator 647 and the Doppler frequency generator 649 generates a 16-bit parallel data at a time so that switching among different channels is quite fast.

For example, the channel control 653 controls C/A code generator 647 and the Doppler frequency 649 to read the first C/A code configuration and the first Doppler frequency configuration respectively. Accordingly, 16-bit parallel C/A code data are generated to be multiplied by the 16-bit parallel data received from the I/Q buffer 61 in the C/A code multiplier 640. In addition, a 16-bit parallel Doppler frequency data are generated to be multiplied by the 16-bit parallel data received from the I/Q buffer 61 in the Doppler multipliers 641a and 641b so as to generate inner products. The inner products are summed up in parallel by means of digital summators 642a and 642b and then accumulated for period of 1 ms or N ms to obtain operation results by coherence integrators 643a and 643b. The outputs of the coherence integrators 643a and 643b are sequentially subject to a squarer 644 for square operations and a non-coherence integrator 645 for accumulating the data for 20 ms. The outputs of the non-coherence integrator 645 are applied to a peak detector 646 for peak detection.

The accumulation operated in the coherence integrators 643a, 643b and the non-coherence integrator 645 is under the control of the channel control 653. The accumulation data of different channels can be temporarily stored into the associated buffer units of a coherence buffer 651 and a non-coherence buffer 652.

Though three tracking channel groups and 64-bit parallel processing design are exemplified above, it is not intended to limit the scope of the present invention. For instance, one tracking channel group can be provided to track twelve satellites at a time. However, the design with plural tracking channel groups is advantageous in power conservation while no channel associated with the same group is necessary to be tracked and then the power of that tracking channel group can be turned off.

Except for the advantages set forth in the first preferred embodiment, the second preferred embodiment provides separate circuits for searching and tracking so that satellite searching and tracking will not affect each other and the design is simpler. Moreover, inactive search channel group or inactive tracking channel group can be temporarily turned off for power conservation. Furthermore, the use of parallel processing makes shared hardware architecture feasible such that the required chip area can be diminished and cost can be decreased.

Although the description above contains much specificity, it should not be construed as limiting the scope of the invention but as merely providing illustrations of some of the presently preferred embodiments of the present invention. Thus, the scope of the present invention should be determined by the appended claims and their equivalents, rather than by the examples given.

What is claimed is:

1. In a spread spectrum receiver capable of receiving signals from a plurality of transmitters, an apparatus comprising:
   a buffer for storing said received signals and generating parallel reception data associated with said received signals;
   a channel searcher for processing said parallel reception data in a parallel format and determining whether any of said plurality of transmitters is found in a position-division manner; and
   a plurality of channel trackers for processing said parallel reception data in said parallel format and tracking said found transmitter in a channel-division manner after said channel searcher finds at least one of said plurality of transmitters,
   wherein said channel searcher comprises:
      a code generator for generating a set of identification codes associated with one of said plurality of transmitters and providing N-bit parallel code data;
      a plurality of search engines for processing said N-bit parallel code data in said position-division manner and providing a plurality of correlation results; and
      a detector for determining whether said set of identification codes is correspondent with said received signals in response to said plurality of correlation results.

2. The apparatus as claimed in claim 1, wherein each of said plurality of search engines comprises:
   a multiplier for multiplying said N-bit parallel code data by said N-bit parallel reception data to generate an N-bit multiplication result; and
   a summator for summing said multiplication result.

3. The apparatus as claimed in claim 2, wherein each of said plurality of search engines further comprises a coherence integrator, a squarer, and a non-coherence integrator sequentially coupled between said summator and said detector.

4. The apparatus as claimed in claim 1, wherein said channel searcher further comprises a frequency generator for generating a frequency signal and providing N-bit parallel frequency data to be multiplied by said N-bit parallel reception data by a multiplier within each of said plurality of search engines.

5. The apparatus as claimed in claim 1, wherein each of said plurality of channel trackers comprises:
   a code generator for generating a set of identification codes associated with one of said plurality of transmitters and providing N-bit parallel code data;
   a channel control for controlling the generation of said set of identification codes in said channel-division manner;
   a correlation circuit for generating a correlation result in response to said N-bit parallel code data and said parallel reception data; and
   a detector for determining whether said set of identification codes is correspondent with said received signals in response to said correlation result.

6. The apparatus as claimed in claim 5, wherein said correlation circuit comprises:
   a multiplier for multiplying said N-bit parallel code data by said parallel reception data to generate an N-bit multiplication result; and
   a summator for summing said multiplication result.

7. The apparatus as claimed in claim 6, wherein each of said correlation circuit further comprises a coherence integrator, a squarer, and a non-coherence integrator sequentially coupled between said summator and said detector.

8. The apparatus as claimed in claim 5, wherein each of said plurality of channel trackers further comprises a frequency generator coupled to said channel control for generating a frequency signal in said channel-division manner and providing N-bit parallel frequency data to be multiplied by said parallel reception data by a multiplier.

9. In a spread spectrum receiver capable of receiving signals from a plurality of transmitters, an apparatus comprising:
   a buffer for storing said received signals and generating parallel reception data associated with said received signals;
   a channel searcher for processing said parallel reception data in a parallel format and determining whether any of said plurality of transmitters is found in a position-division manner; and
   a plurality of channel trackers for processing said parallel reception data in said parallel format and tracking said found transmitter in a channel-division manner after said channel searcher finds at least one of said plurality of transmitters,
   wherein each of said plurality of channel trackers comprises:
      a code generator for generating a set of identification codes associated with one of said plurality of transmitters and providing N-bit parallel code data, a channel control for controlling the generation of said set of identification codes in said channel-division manner, a correlation circuit for generating a correlation result in response to said N-bit parallel code data and said parallel reception data, and a detector for determining whether said set of identification codes is correspondent with said received signals in response to said correlation result.

10. The apparatus as claimed in claim 9, wherein said correlation circuit comprises:

a multiplier for multiplying said N-bit parallel code data by said parallel reception data to generate an N-bit multiplication result; and a summator for summing said multiplication result.

11. The apparatus as claimed in claim 10, wherein each of said correlation circuit further comprises a coherence integrator, a squarer, and a non-coherence integrator sequentially coupled between said summator and said detector.

12. The apparatus as claimed in claim 9, wherein each of said plurality of channel trackers further comprises a frequency generator coupled to said channel control for generating a frequency signal in said channel-division manner and providing N-bit parallel frequency data to be multiplied by said parallel reception data by a multiplier.

* * * * *